United States Patent
Mader et al.

(10) Patent No.: US 9,509,185 B2
(45) Date of Patent: Nov. 29, 2016

(54) ROTOR WITH PERMANENT EXCITATION INCLUDING PERMANENT MAGNETS AND SOFT-MAGNETIC FLUX CONDUCTING ELEMENTS THEREBETWEEN, ELECTRIC MACHINE HAVING SUCH A ROTOR AND MANUFACTURING METHOD FOR THE ROTOR

(71) Applicant: Siemens Aktiengesellschaft, München (DE)

(72) Inventors: Daniel Mader, Bad Neustadt a. d. Saale (DE); Rolf Vollmer, Gersfeld (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 332 days.

(21) Appl. No.: 13/832,623

(22) Filed: Mar. 15, 2013

(65) Prior Publication Data
US 2013/0241338 A1      Sep. 19, 2013

(30) Foreign Application Priority Data
Mar. 16, 2012   (EP) .................................. 12159917

(51) Int. Cl.
*H02K 1/28*      (2006.01)
*H02K 1/27*      (2006.01)
*H02K 15/03*     (2006.01)

(52) U.S. Cl.
CPC .............. *H02K 1/28* (2013.01); *H02K 1/2773* (2013.01); *H02K 15/03* (2013.01); *H02K 2213/03* (2013.01); *Y10T 29/49012* (2015.01)

(58) Field of Classification Search
CPC ........... H02K 1/27; H02K 1/28; H02K 15/03
USPC ......... 310/156.21, 156.61, 156.19, 404–407, 310/156.22, 156.31, 156.55–156.56, 156.59
See application file for complete search history.

(56) References Cited

U.S. PATENT DOCUMENTS

| | | | | |
|---|---|---|---|---|
| 4,543,506 A | * | 9/1985 | Kawada et al. | 310/156.59 |
| 5,452,590 A | * | 9/1995 | Vigili | 310/156.57 |
| 6,078,121 A | * | 6/2000 | Poag et al. | 310/156.05 |
| 6,483,221 B1 | | 11/2002 | Pawellek et al. | |
| 6,628,031 B2 | | 9/2003 | Vollmer | |
| 6,703,741 B1 | | 3/2004 | Ifrim | |
| 6,768,238 B2 | | 7/2004 | Knauff et al. | |
| 6,812,612 B2 | | 11/2004 | Schunk et al. | |
| 6,858,965 B2 | | 2/2005 | Mueller et al. | |
| 6,885,187 B2 | | 4/2005 | Duenisch et al. | |
| 6,943,467 B2 | | 9/2005 | Potoradi et al. | |

(Continued)

FOREIGN PATENT DOCUMENTS

| | | |
|---|---|---|
| CN | 1375122 A | 10/2002 |
| CN | 101663808 A | 3/2010 |

(Continued)

*Primary Examiner* — Michael Andrews
(74) *Attorney, Agent, or Firm* — Henry M. Feiereisen LLC

(57) ABSTRACT

A rotor includes a shaft, a plurality of permanent magnets arranged around the shaft in a circumferential direction for permanent excitation and attached to the shaft by an adhesive bond, and a flux conducting device provided for conducting a magnetic flux of the permanent magnets. The flux conducting device has a plurality of soft-magnetic flux conducting elements. Each flux conducting element is placed between two of the permanent magnets and adhesively bonded thereto.

18 Claims, 4 Drawing Sheets

(56) References Cited

U.S. PATENT DOCUMENTS

| | | |
|---|---|---|
| 7,141,905 B2 | 11/2006 | Vollmer |
| 7,285,883 B2 | 10/2007 | Bott et al. |
| 7,564,158 B2 | 7/2009 | Huth et al. |
| 7,705,507 B2 | 4/2010 | Vollmer |
| 7,709,984 B2 | 5/2010 | Braun et al. |
| 7,732,967 B2 | 6/2010 | Schunk et al. |
| 7,755,315 B2 | 7/2010 | Bott et al. |
| 7,777,373 B2 | 8/2010 | Bott et al. |
| 7,859,160 B2 | 12/2010 | Vollmer |
| 7,915,777 B2 | 3/2011 | Vollmer |
| 7,977,826 B2 | 7/2011 | Vollmer et al. |
| 8,026,640 B2 | 9/2011 | Bott et al. |
| 8,035,371 B2 | 10/2011 | Budde et al. |
| 8,063,517 B2 | 11/2011 | Bott et al. |
| 8,115,360 B2 | 2/2012 | Vollmer |
| 8,134,273 B2 | 3/2012 | Vollmer et al. |
| 8,227,951 B2 | 7/2012 | Grossmann et al. |
| 8,283,815 B2 | 10/2012 | Vollmer |
| 8,378,541 B2 | 2/2013 | Vollmer |
| 2003/0011267 A1 | 1/2003 | Vollmer |
| 2003/0094940 A1 | 5/2003 | Duenisch et al. |
| 2003/0173853 A1 | 9/2003 | Knauff et al. |
| 2004/0075359 A1 | 4/2004 | Muller et al. |
| 2004/0084989 A1 | 5/2004 | Schunk et al. |
| 2004/0155539 A1 | 8/2004 | Potoradi et al. |
| 2004/0261553 A1 | 12/2004 | Bott et al. |
| 2004/0263012 A1* | 12/2004 | Dommsch et al. ...... 310/156.22 |
| 2005/0231060 A1 | 10/2005 | Vollmer |
| 2006/0131976 A1* | 6/2006 | Kikuchi et al. .......... 310/156.46 |
| 2006/0219880 A1 | 10/2006 | Braun et al. |
| 2007/0035193 A1 | 2/2007 | Huth et al. |
| 2007/0040466 A1 | 2/2007 | Vollmer |
| 2007/0114861 A1 | 5/2007 | Bott et al. |
| 2007/0257566 A1 | 11/2007 | Vollmer |
| 2007/0257575 A1 | 11/2007 | Vollmer |
| 2007/0267930 A1* | 11/2007 | Ogava ................. H02K 1/2773 310/156.53 |
| 2008/0073985 A1 | 3/2008 | Bott et al. |
| 2008/0164777 A1 | 7/2008 | Braun et al. |
| 2008/0169718 A1 | 7/2008 | Bott et al. |
| 2008/0185931 A1 | 8/2008 | Platen et al. |
| 2008/0197741 A1 | 8/2008 | Schunk et al. |
| 2008/0197742 A1 | 8/2008 | Vollmer |
| 2008/0289440 A1 | 11/2008 | Denk et al. |
| 2008/0315704 A1 | 12/2008 | Vollmer |
| 2009/0009114 A1 | 1/2009 | Schunk et al. |
| 2009/0015080 A1 | 1/2009 | Vollmer et al. |
| 2009/0039713 A1 | 2/2009 | Bott et al. |
| 2009/0072634 A1 | 3/2009 | Vollmer |
| 2009/0152959 A1 | 6/2009 | Vollmer |
| 2009/0152976 A1 | 6/2009 | Bott et al. |
| 2009/0160283 A1 | 6/2009 | Bott et al. |
| 2009/0184602 A1 | 7/2009 | Braun et al. |
| 2009/0189471 A1* | 7/2009 | Amano et al. ........... 310/156.01 |
| 2009/0206686 A1 | 8/2009 | Vollmer |
| 2009/0212644 A1 | 8/2009 | Bott et al. |
| 2009/0218904 A1 | 9/2009 | Vollmer |
| 2009/0251013 A1 | 10/2009 | Vollmer et al. |
| 2009/0295236 A1 | 12/2009 | Bott et al. |
| 2009/0295251 A1 | 12/2009 | Vollmer et al. |
| 2009/0302832 A1 | 12/2009 | Budde et al. |
| 2009/0315424 A1 | 12/2009 | Vollmer |
| 2009/0322174 A1 | 12/2009 | Grossmann et al. |
| 2010/0000830 A1 | 1/2010 | Budde et al. |
| 2010/0013332 A1 | 1/2010 | Vollmer |
| 2010/0013333 A1 | 1/2010 | Vollmer |
| 2010/0013341 A1 | 1/2010 | Vollmer |
| 2010/0052466 A1 | 3/2010 | Vollmer et al. |
| 2010/0133940 A1 | 6/2010 | Grossmann et al. |
| 2010/0264770 A1 | 10/2010 | Braun et al. |
| 2011/0006617 A1 | 1/2011 | Budde et al. |
| 2011/0121668 A1* | 5/2011 | Condamin et al. ...... 310/156.43 |
| 2012/0025654 A1 | 2/2012 | Bach et al. |
| 2012/0038228 A1 | 2/2012 | Vollmer |

FOREIGN PATENT DOCUMENTS

| | | |
|---|---|---|
| CN | 201975964 U | 9/2011 |
| EP | 0013157 A1 | 7/1980 |
| EP | 2 149 965 A1 | 2/2010 |
| JP | 58099253 A | 6/1983 |
| JP | S58195460 A | 11/1983 |
| JP | H0265636 A | 3/1990 |
| JP | 2008-236895 A | 10/2008 |
| NL | 275 202 | 10/1964 |
| NL | 275202 A | 10/1964 |
| WO | WO 2011/076740 A1 | 6/2011 |

\* cited by examiner

ROTOR WITH PERMANENT EXCITATION INCLUDING PERMANENT MAGNETS AND SOFT-MAGNETIC FLUX CONDUCTING ELEMENTS THEREBETWEEN, ELECTRIC MACHINE HAVING SUCH A ROTOR AND MANUFACTURING METHOD FOR THE ROTOR

CROSS-REFERENCES TO RELATED APPLICATIONS

This application claims the priority of European Patent Application, Serial No. 12159917, filed Mar. 16, 2012, pursuant to 35 U.S.C. 119(a)-(d), the content of which is incorporated herein by reference in its entirety as if fully set forth herein.

BACKGROUND OF THE INVENTION

The present invention relates to a rotor, and to an electric machine having such a rotor, and to a manufacturing method for the rotor.

The following discussion of related art is provided to assist the reader in understanding the advantages of the invention, and is not to be construed as an admission that this related art is prior art to this invention.

A rotor of a type involved here has a plurality of permanent magnets which are arranged around a shaft of the rotor in the circumferential direction in order to provide permanent excitation. A flux conducting device is provided in the rotor for conducting a magnetic flux of the permanent magnets.

Rotors can be provided to form a soft-magnetic base body composed of laminated metal sheets as the flux conducting device. The laminated metal sheets are stacked up in layers to form a laminated core, with an electrically insulating layer being provided between the individual sheets in order to avoid eddy currents. A hole is punched out in the center of the individual sheets so that following its completion the laminated core will have a passage aperture through which the shaft of the rotor is inserted. The laminated core can thus be joined to the shaft by means of an interference fit. Furthermore, cutouts are also punched out on the outer edge of the laminated sheets such that pockets are produced in the finished laminated core in the circumferential direction, into which pockets permanent magnets for producing a permanent excitation of the rotor can be embedded. The term "circumferential direction" has hereby its usual meaning, i.e. in relation to an axis of rotation of the rotor, the directional vectors of the circumferential direction lie in a plane perpendicular to the axis of rotation of the rotor and are tangentially aligned on a circle around the axis of rotation in the plane.

It would be desirable and advantageous to provide an improved rotor with permanent excitation, improved electric machine having such a rotor, and improved method for manufacturing a rotor to obviate prior art shortcomings.

SUMMARY OF THE INVENTION

According to one aspect of the present invention, a rotor includes a shaft, a plurality of permanent magnets arranged around the shaft in a circumferential direction for permanent excitation and attached to the shaft by an adhesive bond, and a flux conducting device provided for conducting a magnetic flux of the permanent magnets, said flux conducting device having a plurality of soft-magnetic flux conducting elements, each flux conducting element being placed between two of the permanent magnets and adhesively bonded thereto.

The present invention resolves prior art problems by mounting the permanent magnets on the shaft itself, i.e. they are not accommodated in pockets of a soft-magnetic laminated core. For example, the permanent magnets are secured to the shaft by an adhesive bond. A flux conducting device is provided to conduct the magnetic flux of the permanent magnets. The flux conducting device includes a plurality of separate soft-magnetic flux conducting elements, for instance individual laminated cores, each of which forming a segment of the rotor. The individual flux conducting elements are each mounted between two of the permanent magnets and secured thereto. This form of attachment is also realized as an adhesive bond.

A rotor according to the invention has the advantage that it can be assembled very easily around the shaft by first fixing the permanent magnets to the rotor shaft, subsequently arranging the flux conducting elements in the spaces between the permanent magnets and then adhesively attaching them to the permanent magnets A permanently excited electric machine can thus be provided at particularly reasonable cost on the basis of a rotor according to the invention. The rotor according to the invention is particularly suitable for producing a synchronous machine, a servomotor and a stepper motor.

The term "shaft" within the context of the invention denotes the entire internal region of the rotor which does not form in any significant way a magnetically active part for generating a torque for driving the rotor or for generating electrical voltage. In other words, the shaft is that part of the rotor which has only a supporting function and serves for mechanically transmitting a torque. In contrast thereto, the magnetically active part is formed by the permanent magnets and the flux conducting elements. The shaft can therefore be a bar made of steel for example or else also a hollow cylindrical body (hollow shaft). In order to increase the size of an outer circumference of the rotor in the region of the permanent magnets, the shaft can have e.g. spokes and, supported by the spokes, a ring to which the permanent magnets are then attached.

According to another advantageous feature of the present invention, the rotor can have perpendicular to its axis of rotation a cross-section in which the permanent magnets can be arranged in a star shape on the shaft, and the flux conducting elements can be arranged in a wedge shape, i.e. segments having a circular sector as basic surface and extending along the axis of rotation of the rotor, between the permanent magnets. The thus resulting rotor is very robust and nonetheless particularly easy to manufacture.

With regard to the permanent magnets themselves, these can be rare earth magnets for example. Currently preferred are ferrite magnets as permanent magnets since they are significantly cheaper than rare earth magnets, even though ferrite magnets have a lower magnetic field strength. However, that is not a problem because the magnetic field of ferrite magnets can be concentrated to such an extent that a magnetic field having the field strength that is usual for permanently excited electric machines can be generated in an air gap between the rotor and a stator of an electric machine. For that purpose, the magnetizations of the permanent magnets should simply point in the circumferential direction, i.e. not radially away from the shaft, but tangentially to the circumference of the shaft. The flux conducting elements located between the permanent magnets ensure that the magnetic field lines are diverted outward in the radial direction and emerge radially from the rotor on its outer circumference. As a result of the diversion, a flux concentration is established such that the field of the ferrite magnets is stronger concentrated in the air gap than at the surface of the ferrite magnets themselves. Rare earth magnets can of course also be used in this case, enabling an even stronger magnetic field to be generated. An even greater flux concentration can be achieved when the magnetizations of two adjacent permanent magnets are aligned in opposite directions to each other.

According to another advantageous feature of the present invention, the flux conducting element can be adhesively bonded to the two permanent magnets by an adhesive layer having in the circumferential direction a thickness of 0.05 mm to 0.25 mm. This produces a magnetic resistance between the permanent magnets and the flux conducting elements that is so small that the magnetic field is only marginally weakened through use of the adhesive bond.

An additional aim in electric machines is also to generate in the air gap between rotor and stator a magnetic field whose field strength extends sinusoidally around the rotor in the circumferential direction. This can be achieved in the case of the rotor according to the invention by a particular configuration of the outer surface of the flux conducting elements, i.e. this surface of each flux conducting element which bounds the latter (in relation to the shaft) in the radial direction outward toward the rotor exterior. The surface advantageously has a curvature in the circumferential direction of the rotor with a curvature radius which is smaller than a radius of an enveloping circle which describes the maximum outer circumference of the rotor in the circumferential direction. Advantageously, the curvature radius may range between 50 and 100 percent of the enveloping circle radius.

In order for the rotor to run as evenly as possible in a rotating magnetic field, the outermost point of a flux conducting element in the radial direction should be arranged at a distance from the axis of rotation of the rotor corresponding to the radius of the enveloping circle, i.e. all outer points of all flux conducting elements should lie on the same enveloping circle. In order to ensure that this is the case and at the same time nonetheless enable simple assembly, an embodiment variant of the rotor according to the invention provides that a flux conducting element radially covers the permanent magnets between which it is arranged, i.e. bears on an edge of the permanent magnet. No adhesive layer is provided in this case in the thus resulting covering zone, with the result that the flux conducting element touches the permanent magnet. As a result, a defined contact is established and only very small tolerances can be accepted during the manufacture of the rotor due to a variable layer thickness of an adhesive bond in this area. Thus, there is advantageously no adhesive layer. Due to manufacturing constraints, however, such a layer cannot always be avoided, when e.g. adhesive residues having a negligible thickness are present. What is important, however, is a defined gap dimension in the contact area. Thus, for example, an adhesive layer can also be provided of a thickness which can be set to e.g. 0.1 mm plus/minus 0.025 mm e.g. by using spacers incorporated in the adhesive.

In order to reduce a manufacturing tolerance even further in the alignment of the flux conducting elements relative to the enveloping circle, the adhesive bonds holding the permanent magnets to the shaft in the radial direction preferably can have a thickness which is less than 0.5 millimeters and advantageously has a tolerance field of less than 0.06 mm. The tolerance of the adhesive layer thickness can be ensured e.g. with the aid of the afore-described spacers. A very precise alignment of the flux conducting elements, glued to the permanent magnets, relative to the enveloping circle can be realized as a result of the small tolerance field, i.e. the defined gap width, and is not dependent on the absolute thickness.

According to another advantageous feature of the present invention, an end plate can be arranged at at least one front face of the rotor in surrounding relationship to the shaft, with the end plate having straps for force-fit the permanent magnets to the shaft. In this way, the end plate is held in place, since the straps exert a bracketing effect on the permanent magnets. Alternatively an end plate can for example also be glued to the front face of the package composed of permanent magnets and flux conducting elements. The end plate can advantageously be used in order to attach a counterbalance to the rotor.

According to another advantageous feature of the present invention, braces can be arranged at radially outer surfaces of the flux conducting elements. As a result, the magnetically active part of the rotor, i.e. the package composed of permanent magnets and flux conducting elements, can be further stabilized against centrifugal forces. These braces can for example take the form of a resin-impregnated fiberglass fabric or yarn. Once the braces have cured, they form a housing element encapsulating the magnetically active part in order to stabilize the rotor against centrifugal forces.

According to another advantageous feature of the present invention, the end plate has a diameter which can be smaller than a diameter of the magnetically active part, i.e. the package of flux conducting elements and permanent magnets, with the braces being fixedly mounted on the end plate.

In the rotor according to the invention end plates and braces can advantageously be combined in such a manner that a diameter of the end plate is chosen to be smaller than a diameter of the package composed of flux conducting elements and permanent magnets, and the braces are the end plates. By tensioning the braces it is possible to exert a contact force onto the flux conducting elements.

As already described, the flux conducting elements are held in place on the permanent magnets by an adhesive bond. When the flux conducting elements are configured such that they themselves do not bear on the shaft, but are held in place on the shaft only indirectly by way of the permanent magnets, there is the advantage that by pressing the flux conducting elements radially inward toward the shaft, each of the permanent magnets is also pressed toward the shaft by two flux conducting elements and as a result a particularly strong seating of the permanent magnets and flux conducting elements in the rotor is achieved. The contact force can hereby for example be generated by braces or alternatively also by brackets.

In order for the rotor to be able to generate a sufficiently strong magnetic field in an air gap between the rotor and a stator of an electric machine, the rotor advantageously has more than six poles. The poles involved here are those which are embodied on the outside face of the rotor, i.e. on the outer surfaces of the rotor in the region of the flux conducting elements.

According to another aspect of the present invention, an electric machine includes a rotor having a shaft, a plurality of permanent magnets arranged around the shaft in a circumferential direction for permanent excitation and attached to the shaft by an adhesive bond, and a flux conducting device provided for conducting a magnetic flux of the permanent magnets, the flux conducting device having a plurality of soft-magnetic flux conducting elements, each flux conducting element being placed between two of the permanent magnets and adhesively bonded thereto.

According to yet another aspect of the present invention, a method for manufacturing a rotor includes adhesively bonding permanent magnets to a shaft, arranging flux conducting elements in spaces between the permanent magnets, and adhesively bonding the flux conducting elements to the permanent magnets.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
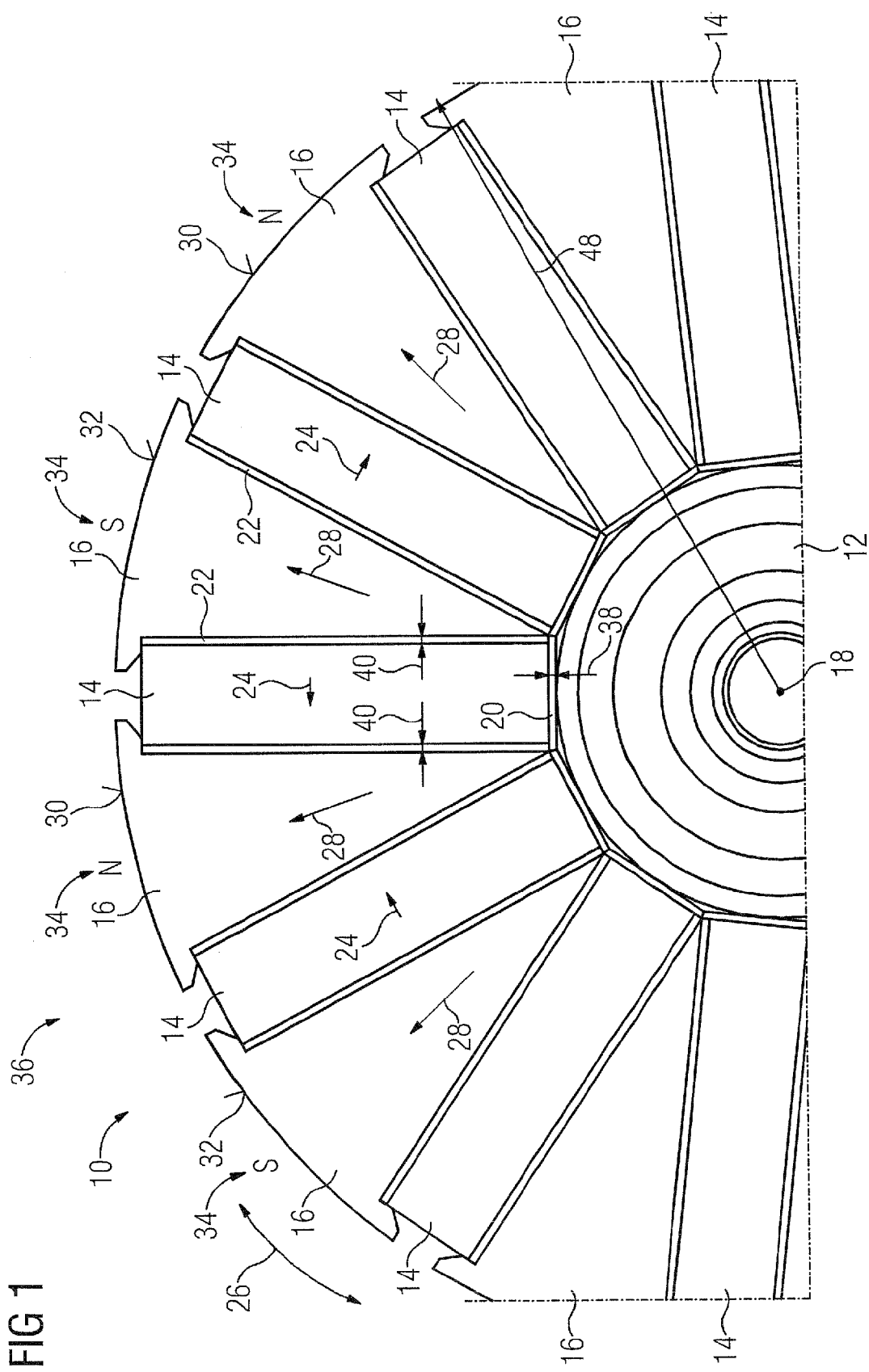
FIG. 1 is a schematic cross-sectional view of one embodiment of a rotor according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic cross-sectional view of one embodiment of a rotor according to the invention, generally designated by reference numeral 10 and having permanent magnets 14 attached to a shaft 12 with flux conducting elements 16 inserted between them in each case. Only a section of the rotor 10 is shown in FIG. 1, as indicated by broken lines. The rotor 10 can be installed in an electric machine, for example a synchronous machine or a servomotor. The electric machine can for example be a drive for an electric vehicle.

An axis of rotation 18 of the rotor 10 extends perpendicularly to the image plane of FIG. 1. The rotor 10 has a cylindrical basic shape overall, the cylinder axis coinciding with the rotor axis 18. In the example shown, the shaft 12 can be formed from a solid body made of steel. The permanent magnets 14 can have an elongate, cuboidal basic shape, the longitudinal dimension extending parallel to the axis of rotation 18. The flux conducting elements 16 likewise are elongate bodies, each having the basic shape of a cylinder segment, bodies likewise being aligned with their longitudinal direction extending parallel to the axis of rotation 18. All in all, the permanent magnets 14 in the cross-section shown in FIG. 1 formed perpendicularly to the axis of rotation 18 are arranged in a star shape on the shaft 12. The flux conducting elements 16 have a wedge shape in cross-section and are arranged between the permanent magnets 14.

FIG. 1 shows a cross-section of a rotor 10 in which permanent magnets 14 are attached to a shaft 12 with flux conducting elements 16 inserted between them in each case. Only a section of the rotor 10 is shown in FIG. 1, as indicated by broken lines. The rotor 10 can be installed in an electric machine, for example a synchronous machine or a servomotor. The electric machine can for example be a drive for an electric vehicle.

An axis of rotation 18 of the rotor 10 extends perpendicularly to the image plane of FIG. 1. The rotor 10 has a cylindrical basic shape overall, the cylinder axis coinciding with the rotor axis 18. In the example shown the shaft 12 can be formed from a solid body made of steel. The permanent magnets 14 can have an elongate, cuboidal basic shape, the longitudinal dimension extending parallel to the axis of rotation 18. The flux conducting elements 16 likewise are elongate bodies, each having the basic shape of a cylinder segment, bodies likewise being aligned with their longitudinal direction extending parallel to the axis of rotation 18. All in all, the permanent magnets 14 in the cross-section shown in FIG. 1 formed perpendicularly to the axis of rotation 18 are arranged in a star shape on the shaft 12. The flux conducting elements 16 have a wedge shape in cross-section and are arranged between the permanent magnets 14.

The permanent magnets 14 can be ceramic magnets, ferrite magnets for example. The permanent magnets 14 are each attached to the shaft 12 by an adhesive bond 20. For clarity of illustration reasons, the position of the adhesive bond 20 is shown for only one of the permanent magnets 14 in FIG. 1. With the permanent magnets 14, a respective magnetization 24 points along a circumferential direction 26 (the circumferential direction 26 being indicated here by a double arrow, because in this case the orientation is irrelevant). The magnetic field generated by the permanent magnets 14 is in this case redirected outward in a radial direction 28 by means of the flux conducting elements 16 and concentrated in the process.

For this purpose the flux conducting elements 16 are produced from a soft-magnetic material. They can each be formed for example by means of a laminated core. The flux conducting elements 16 are not mounted directly on the shaft 12. Each flux conducting element 16 is fixed in place by means of an adhesive bond 22 on those permanent magnets 14 between which it is located. In the case of the adhesive bonds 22, too, only the adhesive bonds 22 for one flux conducting element 16 are labeled with a reference sign in FIG. 1 for clarity of illustration reasons.

As can be seen from FIG. 1, each of the flux conducting elements 16 which is placed circumferentially between two neighboring ones of the permanent magnets 14 and circumferentially adhesively bonded to the two neighboring permanent magnets 14 by the two adhesive bonds 22, is constructed so as to fill completely and without interruption a space between the two adhesive bonds 22 which circumferentially connect each of the flux conducting elements 16 to the two neighboring permanent magnets 14.

The magnetic flux issuing from the permanent magnets 14 at their north poles is guided by the flux conducting elements 16 in a radial direction 28 radially outward to an outlying surface 30 of the corresponding flux conducting elements 16. By way of further flux conducting elements 16 the magnetic flux then reenters the rotor through surfaces 32 of further flux conducting elements 16 and is guided back thereto on the south pole side of the permanent magnets 14.

This results overall in magnetic poles 34 on the outside face of the rotor 10 along its circumference 26. The number of poles 34 is preferably greater than six.

Figure 2:
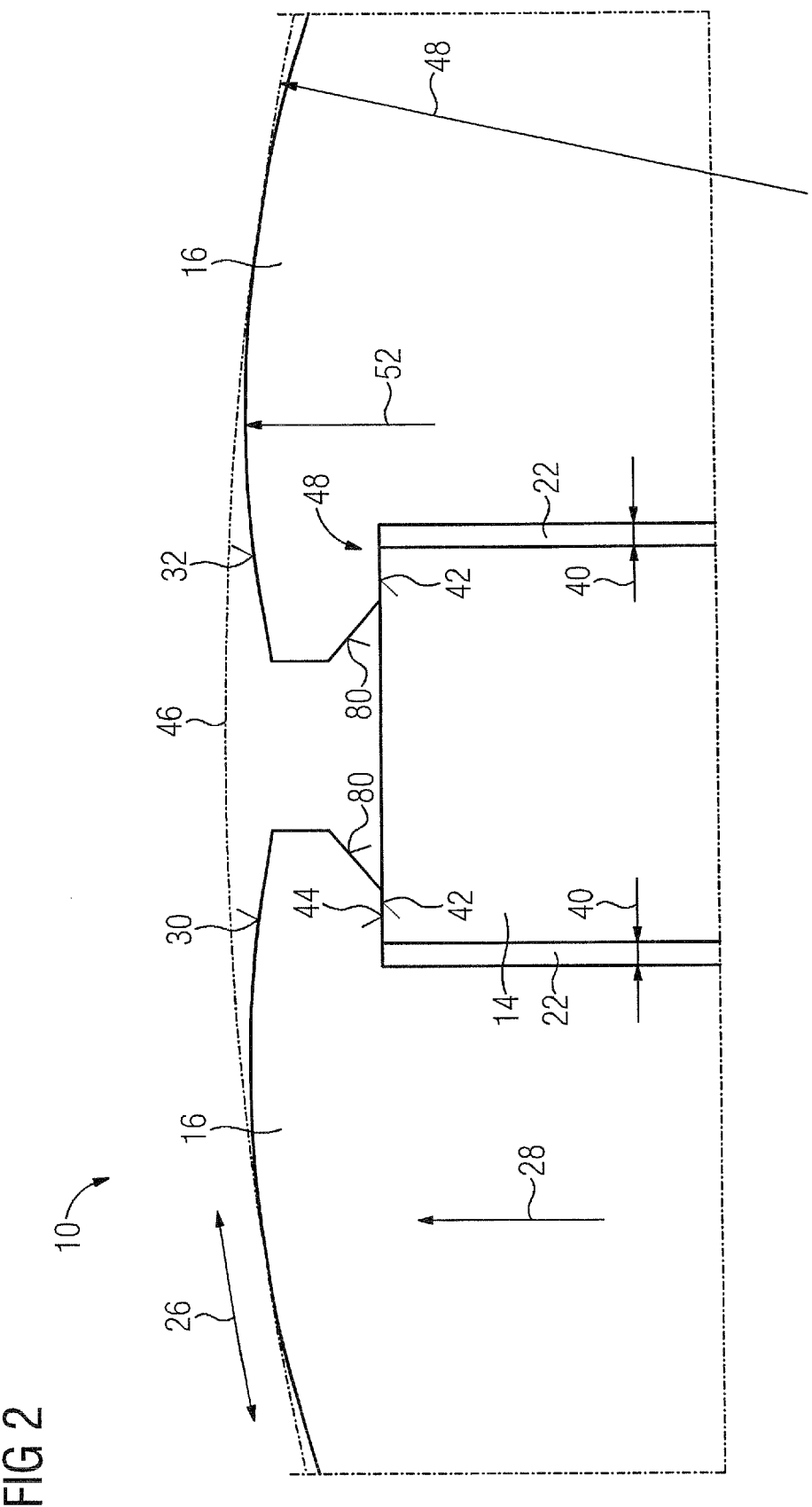
FIG. 2 is a schematic view of permanent magnets which are covered in a radial direction by flux conducting elements, as can be provided for the rotor of FIG. 1.

In the following it is explained in connection with FIG. 1 and FIG. 2 how the magnetically active package 36 composed of the permanent magnets 14 and the flux conducting elements 16 is assembled around the shaft 12 during the manufacture of the rotor 10. In a first production step the permanent magnets 14 are glued to the shaft. The adhesive bonds 20 resulting therefrom are so thin that the distance 38 of the permanent magnets 14 from the shaft has a small tolerance field of less than 0.06 mm. For ease of illustration, only one distance 38 is labeled in FIG. 1. In a second production step the soft-magnetic flux conducting pieces or flux conducting elements 16 are glued between the permanent magnets 14. In this case the adhesive layer 22 preferably has a thickness 40 in a range from 0.05 millimeters to 0.25 millimeters. The flux conducting elements 16 cover the respective adjoining permanent magnets 14 in the radial direction 28, i.e. the flux conducting elements 16 bear with contact surfaces 42 on a radially outward facing outer surface 44 of the permanent magnets 14. Suitably, there is no adhesive between the outer surface 44 and the contact surfaces 42. As a result the flux conducting elements 16 have a defined contact with the permanent magnets 14. The adhesive layer 22 is located only in the circumferential direction 26 between the flux conducting elements 16 and the permanent magnets 14.

The flux conducting elements 16 touch an enveloping circle 46 with their outermost point in the radial direction 28. The enveloping circle 46 describes the maximum outer circumference of the rotor 10 relative to the axis of rotation 18, the enveloping circle 46 extending with a radius 48 around the axis of rotation 18. The radially outer surfaces 30, 32 of the flux conducting elements 16 are curved along the circumference 46, a curvature radius 52 being smaller than the enveloping circle radius 48. For this reason, the flux conducting elements are only tangent to the enveloping circle 46. As a consequence of the curvature of the outer surfaces 30, 32, a field strength of the poles 34 extends virtually sinusoidally along the circumference 26.

Figure 3:
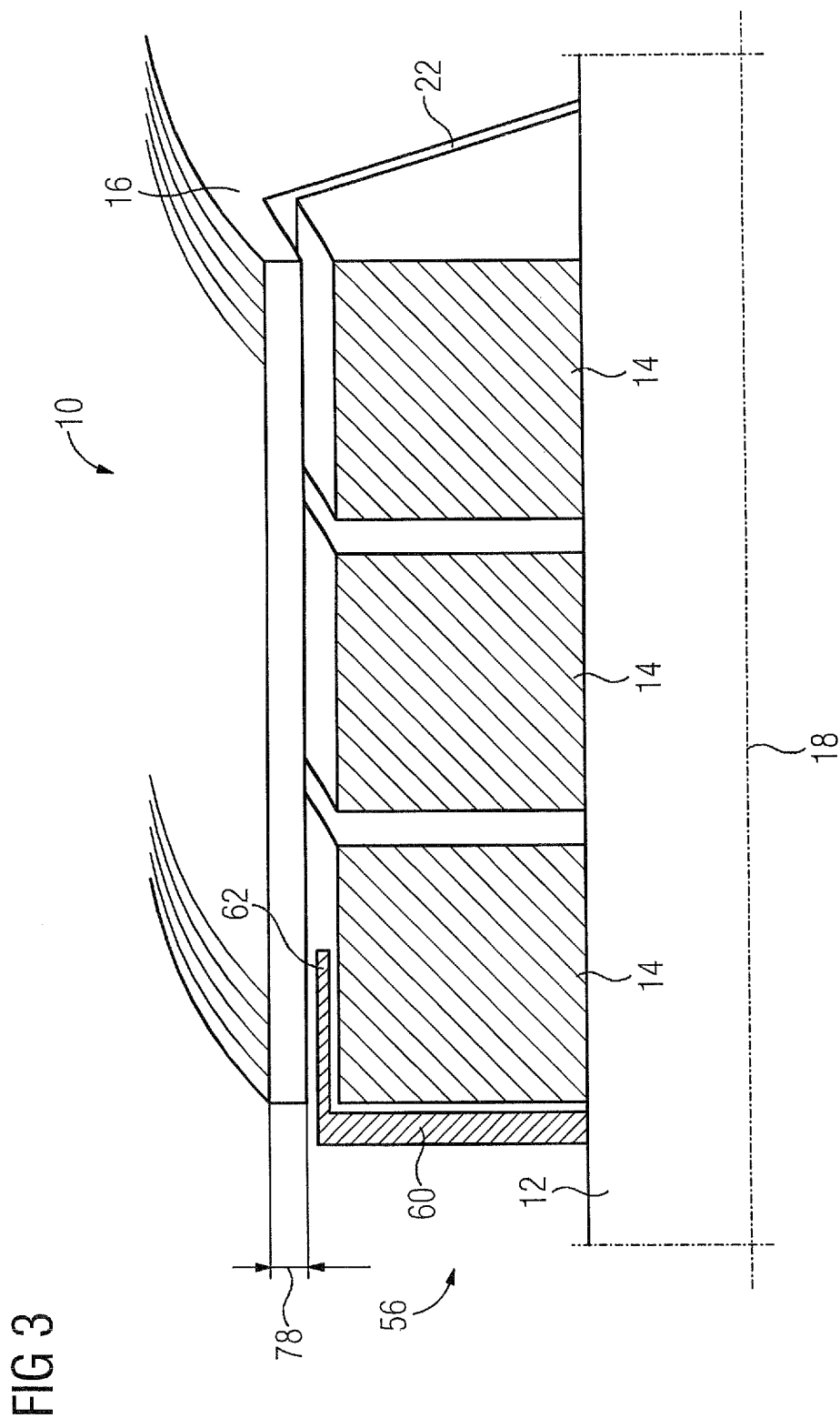
FIG. 3 is a longitudinal section of another embodiment variant of a rotor according to the invention by way of a perspective view.
Figure 4:
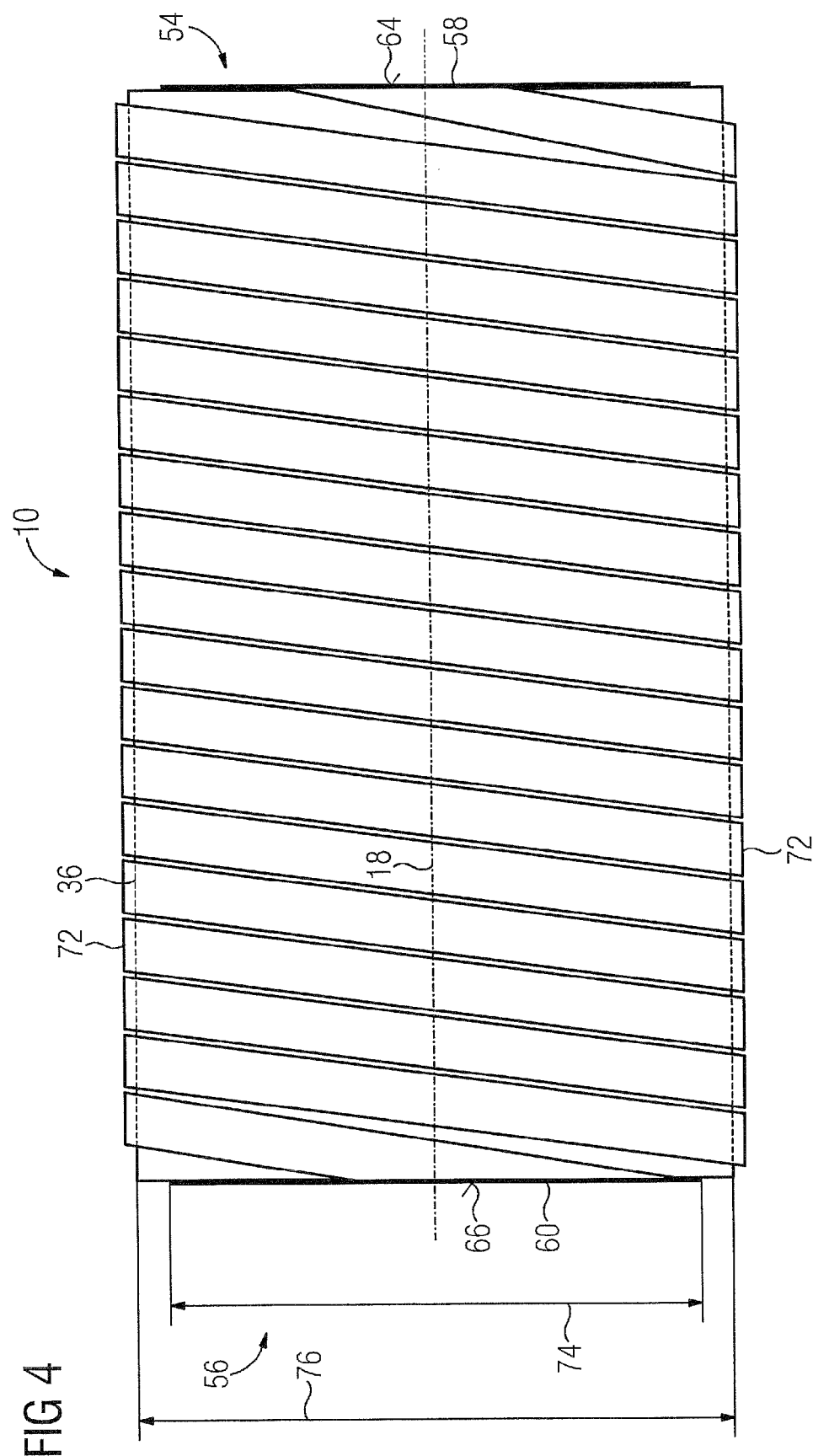
FIG. 4 is a schematic longitudinal section of braces for a rotor according to the invention.

The further manufacturing steps for the rotor 10 are explained in more detail below with reference to FIG. 3 and FIG. 4. FIG. 3 shows hereby that in order to form a specific pole 34 the rotor 10 may also have a plurality of permanent magnets arranged axially in a row.

In a further manufacturing step, end plates 58, 60 can be pushed onto the shaft 12 axially in front of the package 36 at front faces 54, 56 of the rotor. After the mounting of the end plates 58, 60 onto the shaft 12 the ring-shaped terminating surfaces 64, 66 are arranged concentrically with respect to the enveloping circle 46. The end plates 58, 60 may be glued to the package 36. It is also possible to provide the end plates 58, 60 axially protruding straps 62 by way of which the end plates 58, 60 are pushed onto the axially outwardly situated permanent magnets 14 by interference fit. A ring-shaped terminating surface 64, 66 running circumferentially around the shaft 12 is formed in each case at the front faces 54, 56 of the rotor 10 by means of the end plates 58, 60. Braces 72 which may have been wound with a pretensioning force around the package 36 can be attached to the terminating surfaces 64, 66. The braces 72 can be formed for example from reinforced glass fibers that have been impregnated with a synthetic resin. The braces 72 are not shown in FIG. 1 to FIG. 3.

An outer diameter 74 of the end plates 58, 60 is smaller than an outer diameter 76 of the package 36. The difference between the diameters 74 and 76 produces a passage 78. As a result of the tensioning of the braces 72 during the winding operation, a contact force is exerted onto the flux conducting elements 16 and indirectly also onto the permanent magnets 14 radially inward toward the shaft 12. Two end plates 58, 60 are used in the example shown in FIG. 4.

The end plates 58, 60 can also have further fastening elements (not shown) for attaching counterbalances for the rotor 10.

Although the magnetically active part in the rotor 10, i.e. the package 36, is assembled solely by adhesion, the rotor 10 exhibits still very low magnetic scatter. In addition field peaks of the magnetic field issuing from or entering the flux conducting elements 16 are avoided by bevels 80 in the region of the contact surfaces 42.

Overall it is shown how, through the combination of glued structures and high-strength bracing elements, as well as through the fixing by means of at least one end plate and through the force-fitting of the permanent magnets 14 made possible by means of the end plates, and through the indirect force-fitting by means of the braces by way of the flux conducting elements 16, the rotor can be made particularly robust and consequently is also suitable for use in powerful motors. Cost-effective manufacture is nonetheless made possible thanks to the segment-by-segment construction and the joining of the segments by adhesive means.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A rotor, comprising:
   a shaft;
   a plurality of permanent magnets arranged around the shaft in a circumferential direction for permanent excitation and attached to the shaft by an adhesive; and
   a flux conducting device provided for conducting a magnetic flux of the permanent magnets, said flux conducting device having a plurality of soft-magnetic flux conducting elements, each of the flux conducting elements being placed circumferentially between two neighboring ones of the permanent magnets and circumferentially adhesively bonded to the two neighboring permanent magnets by two adhesive layers, each of the flux conducting elements being constructed so as to fill completely and without interruption a space between the two adhesive layers which circumferentially connect each of the flux conducting elements to the two neighboring permanent magnets,
   wherein the permanent magnets are acted upon by a contact force applied via the flux conducting elements so that the flux conducting elements are held in place only indirectly on the shaft by way of the permanent magnets.

2. The rotor of claim 1, wherein the rotor has perpendicular to its axis of rotation a cross-section in which the permanent magnets are arranged in a star shape on the shaft, and the flux conducting elements are arranged in a wedge shape between the permanent magnets.

3. The rotor of claim 1, wherein at least one of the permanent magnets has a magnetization pointing in the circumferential direction in relation to an axis of rotation of the rotor.

4. The rotor of claim 1, wherein the permanent magnets have a magnetization pointing in the circumferential direction in relation to an axis of rotation of the rotor.

5. The rotor of claim 1, wherein the flux conducting element is adhesively bonded to the two permanent magnets by an adhesive layer having in the circumferential direction a thickness of 0.05 mm to 0.25 mm.

6. The rotor of claim 1, wherein at least one of the flux conducting elements has a surface which bounds the flux conducting element in a radial direction and has in the circumferential direction a curvature defined by a curvature radius that is smaller than an enveloping circle radius of an enveloping circle which describes a maximum outer circumference of the rotor in the circumferential direction.

7. The rotor of claim 6, wherein the curvature radius lies in a range between 50 and 100 percent of a value of the enveloping circle radius.

8. The rotor of claim 1, wherein each of the flux conducting elements radially covers two of the permanent magnets between which it is located and touches the two permanent magnets in a covering zone.

9. The rotor of claim 1, wherein the adhesive bond of each of the permanent magnets to the shaft has a thickness of less than 0.5 mm in a radial direction and a tolerance field of less than 0.06 mm.

10. The rotor of claim 1, further comprising an end plate arranged at at least one front face of the rotor and surrounding the shaft, said end plate having straps for force-fit the permanent magnets to the shaft.

11. The rotor of claim 10, wherein the end plate has a diameter which is smaller than a diameter of a package of flux conducting elements and permanent magnets, said braces being attached to the end plate.

12. The rotor of claim 1, further comprising braces arranged at radially outer surfaces of the flux conducting elements.

13. The rotor of claim 12, wherein the braces include reinforced glass fibers.

14. The rotor of claim 1, wherein a number of magnetic poles formed on an outside face of the rotor is greater than 6.

15. The rotor of claim 1, wherein the permanent magnets are ferrite magnets.

16. An electric machine, comprising a rotor including a shaft, a plurality of permanent magnets arranged around the shaft in a circumferential direction for permanent excitation and attached to the shaft by an adhesive bond, and a flux conducting device provided for conducting a magnetic flux of the permanent magnets, said flux conducting device having a plurality of soft-magnetic flux conducting elements, each of the flux conducting elements being placed circumferentially between two neighboring ones of the permanent magnets and circumferentially adhesively bonded to the two neighboring permanent magnets by two adhesive layers, each of the flux conducting elements being constructed so as to fill completely and without interruptions a space between the two adhesive layers which circumferentially connect each of the flux conducting element to the two neighboring permanent magnets, wherein the permanent magnets are acted upon by a contact force applied via the flux conducting elements so that the flux conducting elements are held in place only indirectly on the shaft by way of the permanent magnets.

17. The electric machine of claim 16, constructed in the form of a synchronous machine or as a servomotor or as a drive of an electrically driven passenger vehicle.

18. A method for manufacturing a rotor, comprising:
adhesively bonding permanent magnets to a shaft,
arranging flux conducting elements in spaces between the permanent magnets;
adhesively bonding the flux conducting elements to the permanent magnets by adhesive layers so that each of the flux conducting elements is placed circumferentially between two neighboring ones of the permanent magnets and circumferentially adhesively bonded to the two neighboring permanent magnets by two adhesive layers, and each of the flux conducting elements is constructed so as to fill completely and without interruptions a space between the two adhesive layers which circumferentially connect each of the flux conducting element to the two neighboring permanent magnets; and
acting upon the permanent magnets by a contact force applied via the flux conducting elements so that the flux conducting elements are held in place only indirectly on the shaft by way of the permanent magnets.

* * * * *